United States Patent
Kelsall et al.

(10) Patent No.: US 9,638,818 B2
(45) Date of Patent: May 2, 2017

(54) METHODS AND APPARATUS FOR IMPROVED ACOUSTIC DATA ACQUISITION

(75) Inventors: Neil Kelsall, Stavanger (NO); Mathieu Will, Sugar Land, TX (US); Philip Neville Armstrong, Houston, TX (US); Philippe Lesaffre, Le Plessis-Robinson (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1237 days.

(21) Appl. No.: 13/388,058

(22) PCT Filed: Jul. 30, 2010

(86) PCT No.: PCT/IB2010/001882
§ 371 (c)(1),
(2), (4) Date: Feb. 26, 2012

(87) PCT Pub. No.: WO2011/015913
PCT Pub. Date: Feb. 10, 2011

(65) Prior Publication Data
US 2012/0147703 A1    Jun. 14, 2012

Related U.S. Application Data

(60) Provisional application No. 61/230,747, filed on Aug. 3, 2009.

(51) Int. Cl.
  *G01V 1/00*  (2006.01)
  *G01V 1/42*  (2006.01)
(52) U.S. Cl.
  CPC .......... *G01V 1/42* (2013.01); *G01V 2210/161* (2013.01)

(58) Field of Classification Search
  CPC .......................... G01V 1/42; G01V 2210/161
  See application file for complete search history.

(56) References Cited

U.S. PATENT DOCUMENTS

| | | | |
|---|---|---|---|
| 7,551,516 B2 | 6/2009 | Harmon | |
| 2006/0203614 A1* | 9/2006 | Harmon | G01V 1/42 367/57 |
| 2007/0153628 A1* | 7/2007 | Mathiszik | G01V 1/36 367/57 |
| 2008/0070754 A1 | 3/2008 | Gonzalez | |

FOREIGN PATENT DOCUMENTS

| | | |
|---|---|---|
| GB | 2290869 | 1/1996 |
| WO | 03/023449 | 3/2003 |
| WO | 2007/059073 | 5/2007 |

OTHER PUBLICATIONS

P. Breton, et al., "Well Positioned Seismic Measurements," Oilfield Review, pp. 32-45, Spring 2002.
Decision on grant for the equivalent Russian patent application No. 2012108104 issued on Oct. 9, 2013.

* cited by examiner

*Primary Examiner* — Krystine Breier

(57) ABSTRACT

A technique is designed to facilitate obtaining of acoustic data. The technique comprises traversing a tool through a subterranean formation from a first depth to subsequent depths. The tool receives a seismic signal during predetermined time windows. The seismic signal is generated by a seismic source which is activated at varying times relative to the predetermined time windows based on the depth of the tool.

18 Claims, 3 Drawing Sheets

METHODS AND APPARATUS FOR IMPROVED ACOUSTIC DATA ACQUISITION

CROSS-REFERENCE TO RELATED APPLICATION

The present document is based on and claims priority to U.S. Provisional Application Ser. No. 61/230,747, filed Aug. 3, 2009, the contents of which are hereby incorporated by reference for all purposes and intents.

BACKGROUND OF THE DISCLOSURE

Field of the Invention

The present disclosure relates to techniques for acquiring acoustic data. More particularly, the present disclosure relates to obtaining improved seismic signal data by controlling an activation time of the seismic source.

Background of the Related Art

The following descriptions and examples are not admitted to be prior art by virtue of their inclusion in this section.

Measurement-while-drilling involves the sensing of one or more downhole parameters during the drilling process. Sensors, typically mounted within drill collars located above the drill bit, are used to obtain information regarding the drilling process or subsurface conditions. A subset of these measurements may be transmitted to the surface, often using an acoustic or "mud pulse" telemetry system. Other measurements may be stored in recording devices located within the drill collars. This data can be retrieved when the drill bit is raised (also called "tripped") to the surface.

Seismic measurement-while-drilling data is acquired using seismic sensors, such as geophones or hydrophones that are typically located within a drill collar positioned above the drill bit. Since the drill bit generates a tremendous amount of noise, it is typical to collect seismic data, which may be generated by an uphole source, only during the time the drill bit or drill string is not moving or drilling. This usually equates to the time during which the drill string or drilling is temporarily stopped in order to add or remove pieces of drill pipe to the drill string at the surface.

As mentioned above, communication between the tool and the surface is typically accomplished with a "mud pulse" or other low data telemetry system, making it impractical for the operator to send commands to the tool during drill stoppage to regulate the time sequence or activity related to the seismic data acquisition. Furthermore, due to the vast amount of data that is acquired from the seismic signal, it is also impractical to collect seismic signal data for large periods of time, such as from the time the drilling ceases to the time it commences. To overcome these limitations, the seismic recording system in the tool is programmed to start and stop recording for specific time periods and at specific intervals. In conjunction, the source is activated relative to the programmed time periods to ensure that the seismic signal arrives at the tool during the recording period.

It has been found that there are preferred locations within the recording period where the signal should arrive. This has mostly to do with the processing of the seismic signal once received. It has also been found that as the tool traverses through the earth formation (as the tool is drilling for example), the distance between the tool and the source, and the velocity profile of the formation there between, changes causing the seismic signals to arrive at the tool at undesired times within the period and, more drastically, to miss the period altogether.

SUMMARY

The present invention generally relates to a method and system for obtaining acoustic data by improving the receipt of seismic signals within specified periods. The technique comprises traversing a tool through a subterranean formation from a first depth to subsequent depths. The tool receives a seismic signal during predetermined time windows. The seismic signal is generated by a seismic source which is activated at varying times relative to the predetermined time windows based on the depth of the tool.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

So that the above recited features and advantages of the present invention can be understood in detail, a more particular description of the invention, briefly summarized above, may be had by reference to the embodiments thereof that are illustrated in the accompanied drawings and graphs. In the following description, numerous details are set forth to provide an understanding of the present invention. However, it will be understood by those of ordinary skill in the art that the present invention may be practiced without these details and that numerous variations or modifications from the described embodiments may be possible.

In the specification and appended claims: the terms "connect", "connection", "connected", "in connection with", "connecting", "couple", "coupled", "coupled with", and "coupling" are used to mean "in direct connection with" or "in connection with via another element"; and the term "set" is used to mean "one element" or "more than one element". As used herein, the terms "up" and "down", "upper" and "lower", "upwardly" and downwardly", "upstream" and "downstream"; "above" and "below"; and other like terms indicating relative positions above or below a given point or element are used in this description to more clearly describe some embodiments of the invention.

Figure 1:
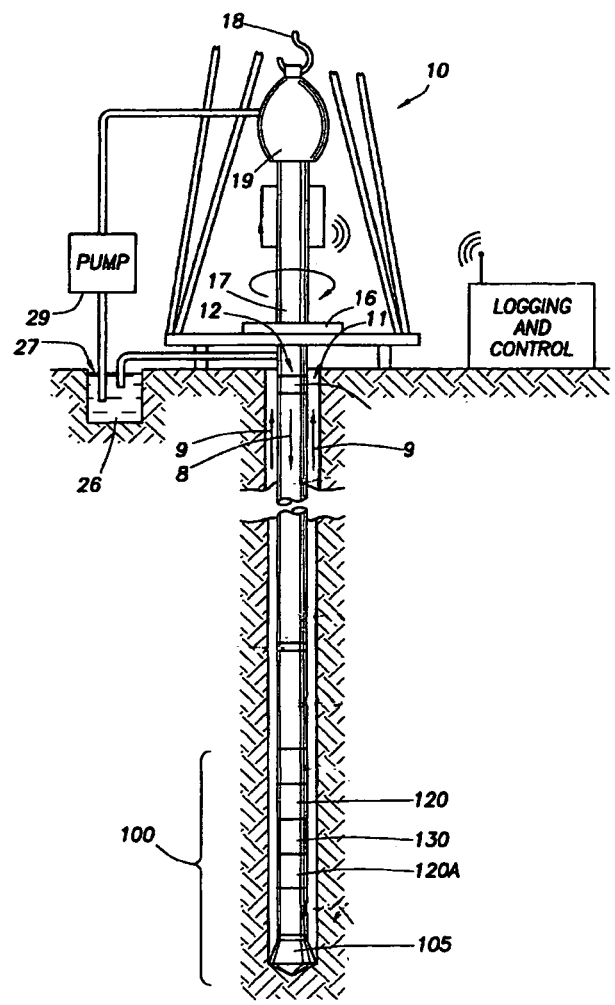
FIG. 1 illustrates an example of a wellsite system in which the method for obtaining seismic data may be employed, according to an embodiment of the present invention.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11. The assembly 10 may include a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment may comprise a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a seismic measuring device as described in greater detail below.

The MWD module 130 also is housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque, measuring device, a vibration measuring device, a shock measuring device, a stick slip measuring device, a direction measuring device, a seismic measuring device, and an inclination measuring device.

FIGS. 2-5 illustrate a seismic-while-drilling tool which can be the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference.

Figure 2:
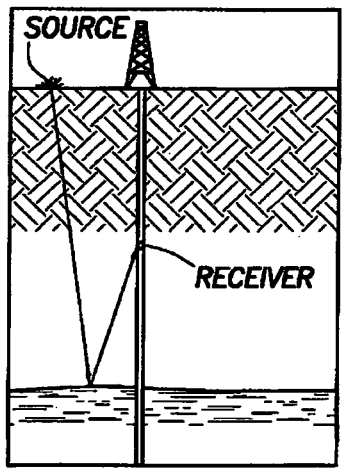
FIG. 2 illustrates an example of a tool used in cooperation with a seismic source, according to embodiment of the present invention.
Figure 3:
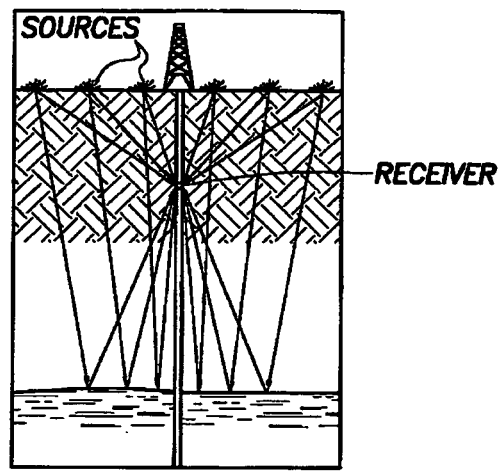
FIG. 3 illustrates an example of a tool used in cooperation with a plurality of seismic sources, according to an embodiment of the present invention.
Figure 4:
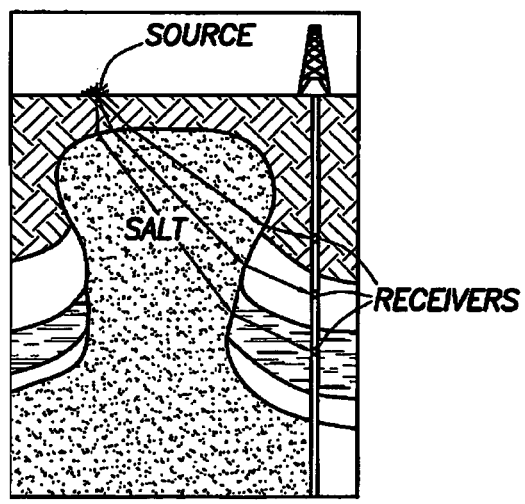
FIG. 4 illustrates an example of a tool having a plurality of receivers used in cooperation with a seismic source, according to an embodiment of the present invention.
Figure 5:
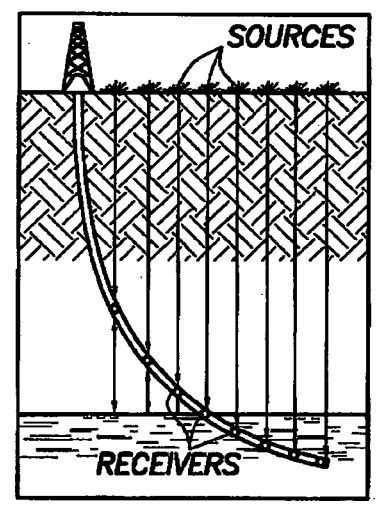
FIG. 5 illustrates an example of a tool having a plurality of receivers used in cooperation with a plurality of seismic sources, according to an embodiment of the present invention.

The downhole LWD tool can have a single receiver (as depicted in FIGS. 2 and 3), or plural receivers (as depicted in FIGS. 4 and 5), and can be employed in conjunction with a single seismic source at the surface (as depicted in FIGS. 2 and 4) or plural seismic sources at the surface (as depicted in FIGS. 3 and 5).

Accordingly, FIG. 2, which includes reflection off a bed boundary, and is called a "zero-offset" vertical seismic profile arrangement, uses a single source and a single receiver. FIG. 3, which includes reflections off a bed boundary, and is called a "walkaway" vertical seismic profile arrangement, uses plural sources and a single receiver. FIG. 4, which includes refraction through salt dome boundaries, and is called a "salt proximity" vertical seismic profile, uses a single source and plural receivers. FIG. 5, which includes some reflections off a bed boundary, and is called a "walk above" vertical seismic profile, uses plural sources and plural receivers.

Figure 6:
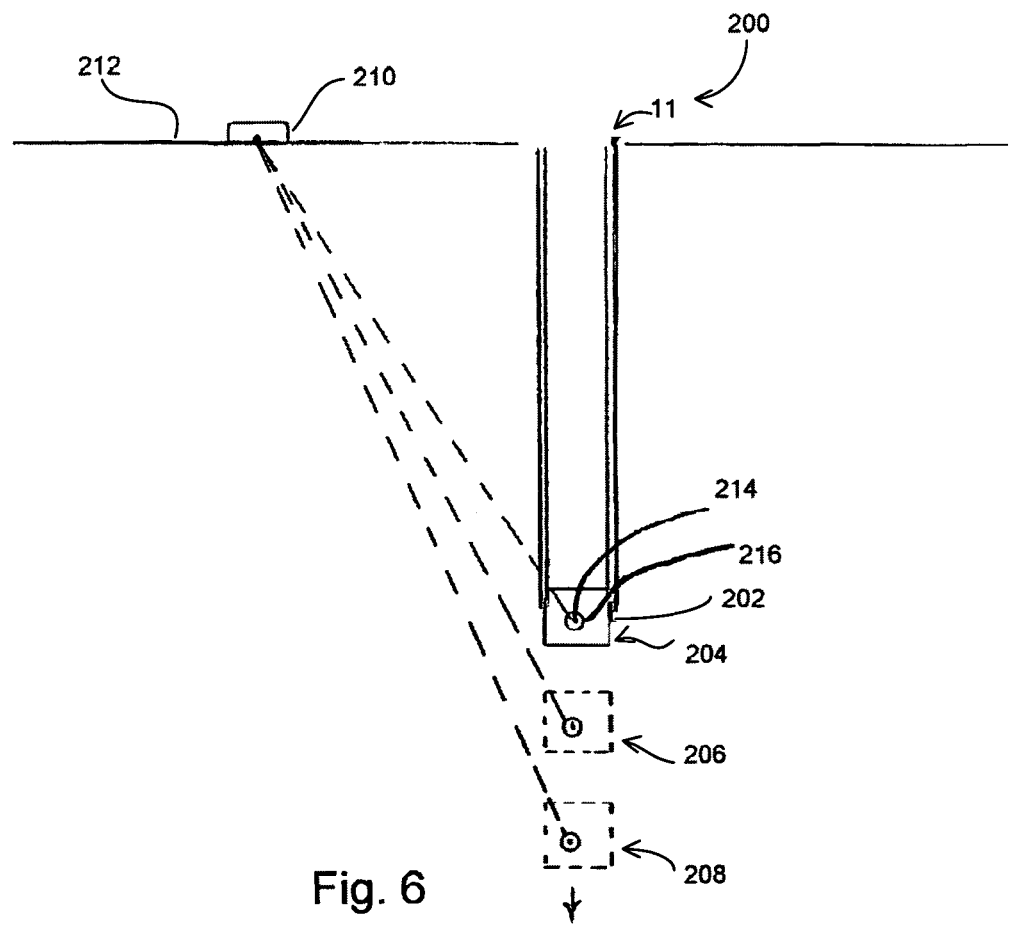
FIG. 6 illustrates an example of a tool receiving signals from a seismic source as the tool is moved progressively deeper into a subterranean formation, according to an embodiment of the present invention.

As described in the background, to overcome the obstacles created by a low data telemetry system and/or by the vast amounts of data acquired from seismic signals, a system 200 for obtaining seismic data is provided. A schematic embodiment of one example of the system 200 is illustrated in FIG. 6. System 200 may comprise a tool 202 which is traversed along the borehole 11 through, for example, a series of depths 204, 206 and 208 at which seismic signals are received and recorded. The number of depths at which seismic signals are recorded may vary from one application to another, and in some applications, the number of different depths at which recordings are made can be substantial.

System 200 further comprises at least one seismic source 210 which may be located at or near a surface location 212. In some applications, system 200 may comprise a plurality of seismic sources 210, as illustrated in the embodiment of FIG. 3 or FIG. 5. Similarly, the type of tool 202 may vary from one application to another and may comprise individual components or a bottom hole assembly, such as bottom hole assembly 100 (see FIG. 1). However, the tool 202 comprises a seismic receiver 214 which is part of a seismic recording system 216. By way of additional example, the tool 202 may comprise drill bit 105 combined with a traversing while drilling system, such as logging while drilling module 120 and/or measuring while drilling module 130. The traversing while drilling system may be designed to incorporate the seismic receiver 214 and seismic recording system 216. It should be noted that in other embodiments, tool 202 may comprise tubing or other drilling components. In some cases, a wireline operation may be performed using aspects of the embodiments described herein.

In the example illustrated, seismic recording system 216 of tool 202 is programmed to automatically start recording at specified times and for specified periods in conjunction with the timely activation of the source 210. Accordingly, in one example of a system and methodology for obtaining seismic data, the tool 202 (e.g. MWD module, LWD mitral, Coiled tubing, Wireline, or other tools or tool components) is traversed through a subterranean formation to a first depth 204, as illustrated in FIG. 6, and as further illustrated graphically in FIG. 7. Once at the first depth, the seismic signal recording mechanism 216 is activated in the tool 202. The recording mechanism 216 is programmed to record a seismic signal during a plurality of predetermined recording periods which may be referred to as time windows.

In parallel, the seismic source 210 is activated at or near surface 212 a plurality of times while the tool 202 is at the first depth 204. The seismic source 210 is activated such that the seismic signal produced by the source 210 is received at the tool 202 and its seismic receiver 214 at a desired instant in each recording period/time window 218 (see FIG. 7). The tool 22 is then traversed to a second depth, e.g. depth 206, deeper than the first depth 204, and the seismic signal recording mechanism 216 in the tool 202 is activated again. When the tool 202 is at the second depth 206, the seismic source 210 is activated earlier, relative to each predetermined recording period than when at the first depth 204, as graphically illustrated by timing difference 220 in FIG. 7. By activating the seismic source 210 earlier relative to the predetermined time windows of the recording mechanism 216 at the deeper depth 206, the seismic signal produced by the source 210 is received at the tool 202 at the same desired instant in the recording periods/time windows 218, as illustrated by timing markers 222.

Figure 7:
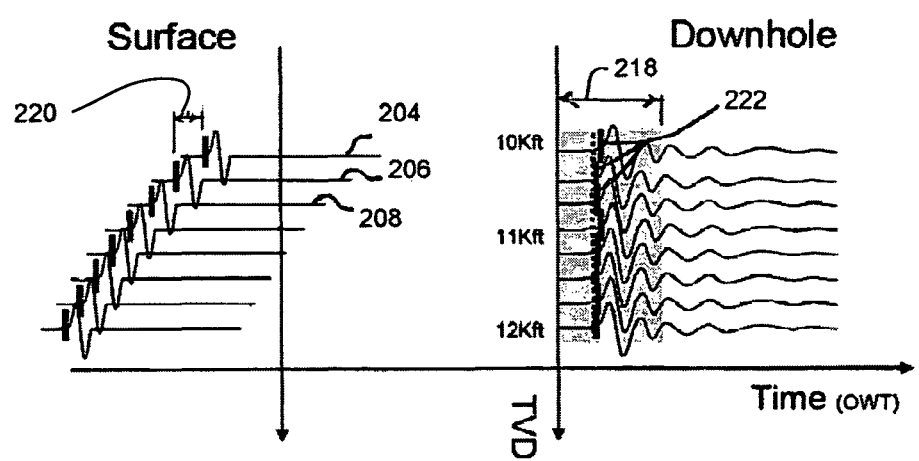
FIG. 7 provides a graphical representation of an embodiment of a methodology for changing the timing of the seismic source relative to predetermined time windows for receiving the seismic signal at the tool, according to an embodiment of the present invention.

As the tool 22 is then traversed to a third depth, e.g. depth 208, deeper than the second depth 206, the seismic signal recording mechanism 216 in the tool 202 is activated again. When the tool 202 is at the third depth 208, the seismic source 210 is activated still earlier (relative to each predetermined recording period) than when at the second depth 206, as graphically illustrated by the next subsequent timing difference 220 in FIG. 7. By activating the seismic source 210 earlier at the deeper depth 208 relative to the predetermined time windows of the recording mechanism 216, the seismic signal produced by source 210 is received at tool 202 at the same desired instant in the recording periods/time windows 218, as illustrated by timing markers 222. This process may be repeated at each subsequent depth to facilitate recording of the seismic signal at the desired point within the recording period during which seismic recording system 216 is activated. As illustrated in FIG. 7, the timing of seismic source 210 may be progressively earlier relative to the timing of the recording period 218 during activation of seismic recording system 216. Thus, there is a timing difference 220 between initiation of the seismic source 210 at a subsequent depth versus initiation of seismic source 210 at the previous depth relative to initiation of the predetermined recording period for seismic recording system 216 of tool 202.

According to one embodiment, the plurality of predetermined time windows 218 may be about 3 seconds in duration, separated by a duration of about 12 seconds of non-recording. In a specific example, the desired instant at which the seismic signal is received within the time windows 218 may be toward the beginning of the time windows. However, the length of the predetermined recording periods/time windows 218, as well as the duration by which the timing windows are separated at each depth, may be changed according to the specifics of a given application and environment. Additionally, the changes in timing of the seismic source 210 relative to the recording periods 218 may be the same or different as tool 202 is moved to different depths.

For example, the timing differences 220 may be adjusted to achieve a variety of goals with respect to recording seismic data and with respect to environmental considerations. Velocity models are sometimes prepared to address specific characteristics of a given subterranean environment. In these applications, the seismic source 210 may be activated relatively earlier or the timing differences 220 may be otherwise selected based at least partially on variation predicted by the velocity model between one depth and subsequent depths.

Generally, FIG. 7 depicts one example of the correlation of a time delay in activation of source 210 with the signal being received by tool 202. The right side of FIG. 7 shows that regardless of the depth of the tool 202, the seismic signal is received at approximately the same time in the acquisition time window 218. This is accomplished by activating the seismic source 210 earlier with respect to the seismic recording system time window 218, as the tool 202 runs deeper and as illustrated on the left side of FIG. 7.

As discussed above, the system 200 for obtaining seismic data may be combined with many types of downhole tools, such as drilling related tools, to improve the receipt of seismic signals within specified periods of seismic recording mechanism activation. The seismic receiver 214 and a seismic recording system 216 may be mounted on or with an MWD system, a LWD system, various other seismic while drilling tools, or on or with entirely different types of tools. The system 200 also may be used with tools in the form of various types of tubing strings and bottom hole assemblies in applications where accumulation of seismic data is desired. Furthermore, the number of seismic sources and seismic recording systems/seismic receivers may vary from one application to another. The changes in activation timing of the seismic source 210 relative to the activation time window/recording period of the seismic recording system also may be adjusted linearly or non-linearly depending on the environment, the distance between recording depths, the length of the recording period, the characteristics of the tool, and on other factors related to specific seismic applications.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method of obtaining acoustic data, comprising:
traversing a tool through a subterranean formation on a drill string to a first depth during a drilling operation;
stopping drilling for a first length of time at the first depth;
activating an acoustic source at or near a surface location at a specific first instant in time relative to a beginning of the first length of time;
recording a signal, produced via the source, with the tool during a predetermined recording period occurring during the first length of time;
traversing the tool to a second depth deeper than the first depth during the drilling operation;
stopping drilling for a second length of time at the second depth;

activating an acoustic source at or near the surface location at a specific second instant in time relative to a beginning of the second length of time; and recording a signal, produced via the source, with the tool during a predetermined recording period occurring during the second length of time, the specific second instant in time being relatively earlier with respect to the beginning of the second length of time compared to the first instant in time with respect to the beginning of the first length of time;

wherein a consistent downhole recording scheme is used such that the signals are received at a same desired time in the corresponding recording periods of the first length of time and the second length of time; and wherein the predetermined recording periods occur at a same predetermined time within the corresponding first length of time and the second length of time.

2. The method of claim 1, wherein traversing the tool comprises traversing a seismic while-drilling tool.

3. The method of claim 1, wherein traversing the tool comprises traversing a logging while drilling tool.

4. The method of claim 1, wherein traversing the tool comprises traversing a measuring while drilling tool.

5. The method of claim 1, wherein recording comprises recording the signal with a single receiver of the tool.

6. The method of claim 1, wherein activating the acoustic source comprises activating a plurality of sources at or near the surface location.

7. The method of claim 1, further comprising subsequently activating the acoustic source at additional lengths of times, wherein the subsequently activating occurs at progressively earlier times within each of an additional length of time relative to a successive corresponding predetermined recording period.

8. A method of obtaining seismic data using a while-drilling tool, comprising:

traversing a while-drilling tool through a subterranean formation to a first depth;

activating a seismic signal recording mechanism in the tool while at the first depth, wherein the recording mechanism is programmed to record seismic signals during a plurality of predetermined time windows;

activating a seismic source at or near a surface a plurality of times while the tool is at the first depth, wherein the source is activated such that the seismic signal produced by the source is received at the tool at a desired instant within each of the predetermined time windows;

traversing the tool through the subterranean formation to a second depth deeper than the first depth;

activating the seismic signal recording mechanism in the tool while at the second depth, wherein the recording mechanism is programmed to record subsequent seismic signals during a plurality of subsequent predetermined time windows;

activating the seismic source at or near the surface a plurality of times while the tool is at the second depth, wherein the source is activated at an earlier instant in time with respect to each of the subsequent predetermined time windows compared to the instant in time at which the seismic source was activated with respect to each of the predetermined time windows at the first depth, such that the seismic signal produced by the source is received at the tool at the same desired instant within each of the subsequent predetermined time windows at the second depth as within each of the predetermined time windows at the first depth.

9. The method of claim 8, wherein each predetermined time window of the plurality of predetermined time windows is about 3 seconds in duration, separated by a duration of about 12 seconds of non-recording.

10. The method of claim 8, wherein the desired instant in the time windows is at the beginning of the time windows.

11. The method of claim 9, wherein the time windows vary in duration.

12. The method of claim 8, wherein the source is activated earlier at least partially based on a variation of a velocity model between the first depth and the second depth.

13. A system for obtaining seismic data, comprising:

a tool traversed through a subterranean formation to subsequently deeper depths, the tool having a recording mechanism programmed to record a seismic signal during a sequence of a plurality of predetermined recording windows having a predetermined length of time; and a seismic source activated at or near the surface at specific times relative to each predetermined recording window of the sequence of the plurality of predetermined recording windows, wherein the seismic source is activated earlier relative to each subsequent predetermined recording window as the tool is moved to the subsequently deeper depths, such that a seismic signal produced by the seismic source is recorded at the tool using a consistent downhole recording scheme wherein the seismic signal is received at approximately the same desired instant within each of the subsequent predetermined recording windows as within each of the predetermined recording windows of a previous depth.

14. The system as recited in claim 13, wherein the tool comprises a traversing while drilling tool.

15. The system as recited in claim 13, wherein the tool comprises a logging while drilling tool.

16. The system as recited in claim 13, wherein the tool comprises a measuring while drilling tool.

17. The method of claim 1, wherein the predetermined recording periods each comprise two or more time windows for recording separated by a corresponding number of non-recording intervals.

18. The system as recited in claim 13, wherein each of the predetermined recording windows of the sequence of the plurality of predetermined recording windows is separated from another predetermined recording window by a non-recording interval.

* * * * *